United States Patent [19]

Tateno

[11] Patent Number: 5,013,782

[45] Date of Patent: May 7, 1991

[54] FLAME RETARDANT RIGID OR FLEXIBLE CHLORINE-CONTAINING RESIN COMPOSITION

[75] Inventor: Izuru Tateno, Toyama, Japan

[73] Assignee: Nippon Carbide Kogyo Kabushiki Kaisha, Tokyo, Japan

[21] Appl. No.: 342,027

[22] Filed: Apr. 24, 1989

[30] Foreign Application Priority Data

Apr. 22, 1988 [JP] Japan ................................. 63-98399

[51] Int. Cl.⁵ ............................................... C08K 3/32
[52] U.S. Cl. ..................................... 524/417; 524/430; 524/434; 524/436; 524/437
[58] Field of Search ............... 524/415, 417, 430, 434, 524/436, 437

[56] References Cited

U.S. PATENT DOCUMENTS

| | | | |
|---|---|---|---|
| 3,249,534 | 5/1966 | Ware | 524/417 |
| 3,560,441 | 2/1971 | Schwarcz et al. | 524/409 |
| 3,996,142 | 12/1976 | White et al. | 524/417 |
| 4,079,022 | 3/1978 | Ferrarini et al. | 524/406 |
| 4,439,572 | 3/1984 | Kindrick | 524/417 |
| 4,456,723 | 6/1984 | Breitenfellner et al. | 524/415 |
| 4,544,695 | 10/1985 | Myers | 524/415 |
| 4,608,198 | 8/1986 | Watanabe et al. | 524/410 |
| 4,883,533 | 11/1989 | Kosin et al. | 524/417 |

OTHER PUBLICATIONS

W. S. Penn: *PVC Technology*, pp. 390–401 (1966).

*Primary Examiner*—Veronica P. Hoke
*Attorney, Agent, or Firm*—Sherman and Shalloway

[57] ABSTRACT

A chlorine-containing resin composition comprising a chlorine-containing resin, and (a) a metal-containing inorganic solid powder containing at least 30% by weight of phosphorus as $P_2O_5$ and (b) at least one flame- and fire-retardant agent selected from hydroxides and oxides of metals belonging to Groups II to V of the periodic table.

29 Claims, 1 Drawing Sheet

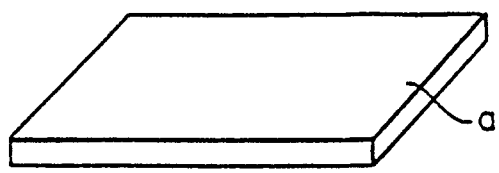
FIG. IA
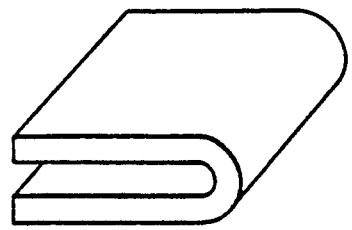
FIG. IB
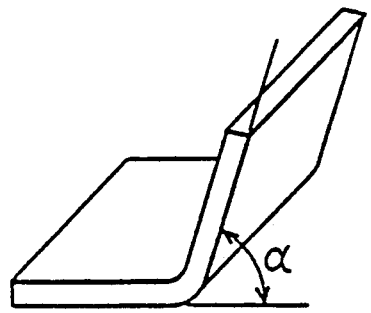
FIG.IC

FLAME RETARDANT RIGID OR FLEXIBLE CHLORINE-CONTAINING RESIN COMPOSITION

This invention relates to a rigid or flexible chlorine-containing resin composition which is flame retardant and low smoke-generating and sinters and solidifies at the time of forced burning. More specifically, it relates to a chlorine-containing resin composition which has much improved flame retardancy, much reduced smoke-generating property and much improved sintering and solidifying property, and can be effectively utilized as a raw material for various articles requiring flame retardancy and sintering and solidifying property, such as fire protective pipes, power cable coverings, gaskets and joints for fire doors, flame-retardant tubes and hoses, and plastic sashes.

Plastic molded articles, particularly flexible plastic articles, such as power cable coverings, gaskets and joints for fire door sashes, and hoses and tubes which are always exposed to electric sparks or welding sparks frequently give rise to a safety problem not only in case of emergency such as fires of buildings, underground cables and vehicles, but also when they are exposed to welding sparks in construction sites.

Attempts have previously been made to add flame retardants such as antimony trioxide or metal hydroxides, or inorganic fillers in order to impart flame retardancy to synthetic rubbers, polyethylene and vinyl chloride resins or to prevent deformation or welding of these materials by fire. Molded articles obtained by applying such methods generate great amounts of smokes or undergo much dripping by melt softening when exposed to fire or sparks. Furthermore, when they are exposed to fire for a long period of time, they may be burnt away or disintegrated in a sand form, lose their initial shape, or their protective materials or covering cannot be prevented from deforming or being burnt away. Furthermore, the inherent function of the molded articles cannot be retained.

Synthetic rubber articles have rubbery elasticity and excellent flexural strength, but since they are flammable, they may cause spreading of fire and generate smokes with large quantities of soot. Furthermore, since they have poor weatherability, it has to be molded in large thickness to prevent strength degradation. Consequently, the molded articles have a large weight and poor workability and becomes high in cost.

Articles of polyethylenes such as crosslinked polyethylene have excellent electrical properties or flexibility, but are very flammable. When they are used as cable coverings, they may be burnt and softened and easily separate from the cables and may become the cause of a secondary accident such as shorting.

Flexible vinyl chloride resins are better than the above-cited two materials in that they are self-extinguishing. But since their flame retardancy is reduced by the addition of plasticizers and they generate much smoke and have a low softening point, they immediately soften and sag when exposed to fire or sparks. For example, when a flexible vinyl chloride resin is used as a gasket for a fire door, the glass plate will separate from the gasket, and cannot perform the role of a fire door. When it is used as a pressure gas hose or tube in a construction site, and welding sparks adhere to the hose, the adhering parts soften, and pinholes will form because of the pressure inside. The gases escape from the pinholes and the hose loses its function of a pressure-resistant gas hose.

It is an object of this invention therefore to eliminate the above-mentioned defects of chlorine-containing resins such as vinyl chloride resins and chlorinated vinyl chloride resins, and to provide a chlorine-containing resin composition which is flame-retardant and low smoke-generating and even in forced combustion, for example, at the time of fire, remains as a solid cinder without disintegration (namely, has excellent "sintering and solidifying property"), and thus can continue to remain as a heat insulating covering or a support and prevent a secondary accident.

The present inventors made extensive investigations in order to achieve the above object, and have now found that by incorporating a specific phosphorus-containing inorganic solid powder and a flame- and fire-retardant agent in a chlorine-containing resin, a chlorine-containing resin composition can be obtained which has excellent flame retardancy, low smoke generating property and sintering and solidifying property.

Thus, according to this invention, there is provided a chlorine-containing resin composition comprising a chlorine-containing resin, and (a) a metal-containing inorganic solid powder containing at least 30% by weight of phosphorus as $P_2O_5$ and (b) at least one flame- and fire-retardant agent selected from hydroxides and oxides of metals belonging to Groups II to V of the periodic table.

The resin composition provided by this invention will be described below in detail.

CHLORINE-CONTAINING RESIN

Chlorine-containing resins that can be treated in accordance with this invention include moldable resins of the type in which chlorine is bonded to the polymer chain. Specific examples are chlorinated vinyl chloride resins; vinyl chloride resins such as polyvinyl chloride, vinyl chloride/vinyl acetate copolymer and vinyl chloride/ethylene copolymer; chlorinated polyolefins such as chlorinated polyethylene and chlorinated polypropylene and chlorine-containing rubbers such as chloroprene and chlorinated rubbers. Of these, the chlorinated vinyl chloride resins, vinyl chloride resins, chlorinated polyethylene and chloroprene are preferred, and the chlorinated vinyl chloride resins are especially preferred.

Usually, the chlorinated vinyl chloride resins preferably have a chlorine content of about 60 to about 72% by weight, and a specific viscosity (measured by the method described in JIS K-6721) of at least about 0.20. Especially preferred is a chlorinated vinyl chloride resin having a chlorine content of 64 to 70% and a specific viscosity of at least 0.24 and obtained by chlorinating a vinyl chloride resin having an average degree of polymerization of at least 1,300. Above all, a composition containing a chlorinated vinyl chloride resin viscosity of at least 0.4, desirably at least 0.5, obtained by post-chlorinating a vinyl chloride resin having an average degree of polymerization of 2,500 to 10,000 is preferred because it hardly sags, deforms or burn off by fire for a long period of time, but remains a firm shape-retaining sintered residue.

Flexible molded articles of polyvinyl chloride having an average degree of polymerization of 2,500 to 10,000 also have good rubbery elasticity and do not melt and sag at the time of burning.

The above chlorine-containing resins may be used singly or in combination with each other. For obtaining molded articles of flexible formulations, the above chlorine containing resins, especially the chlorinated vinyl chloride resins and the vinyl chloride resins, are desirably used in combination with a softening agent.

The softening agent may include plasticizers, elastomers or mixtures of both. It has moderate compatibility with the chlorine-containing resin and is incorporated to reduce the hardness of the resins and increase their rubbery elasticity.

The plasticizers include, for example, phthalate-type plasticizers such as dioctyl phthalate (DOP) and dibutyl phthalate (DBP); phosphorus-containing plasticizers such as tricresyl phosphate (TCP) and trioctyl phosphate (TOF); chlorinated paraffins; epoxy-type plasticizers; trimellitate-type plasticizers; and polymeric ester-type plasticizers. From the viewpoint of flame-retardancy, halogen-containing plasticizers and phosphorus-containing plasticizers are preferred, and the polymeric plasticizers are preferred to prevent melting and sagging during burning.

The amount of the plasticizer is not particularly limited strictly. Generally, it is desirably at least 40 parts by weight, preferably 50 to 150 parts by weight, especially preferably 70 to 120 parts by weight, per 100 parts by weight of the chlorine-containing resin.

Examples of the elastomers include chlorinated polyethylene having a chlorine content of 30 to 50% and a molecular weight of about 50,000 to about 400,000, ethylene/vinyl acetate copolymer (ethylene/vinyl acetate weight ratio of 85/15 to 50/50), graft copolymers thereof, nitrile rubber, polyurethane elastomers, ethylene/ propylene copolymer, MBS (methyl methacrylate/butadiene/ styrene copolymer), ethylene/-propylene/diene terpolymers, fluorine-containing rubbers, silicone rubbers, and vulcanized products of these elastomers.

The amount of the elastomers is not critical but may be varied over a broad range depending upon the properties required of the resin composition, and when no plasticizer is used in combination, it is at least 30 parts by weight, especially 50 to 150 parts by weight, per 100 parts by weight of the chlorine-containing resin.

When the plasticizer and the elastomer are used together, it is preferable to use the 20 to 90 parts by weight of the plasticizer and 80 to 10 parts by weight of the plasticizer per 100 parts by weight of both combined. More preferably, 40 to 80 parts by weight of the plasticizer and 60 to 20 parts of the elastomer are used.

When the elastomer is to be incorporated, it is possible to incorporate a crosslinking agent or a peroxide further in the resin composition in order to increase its elasticity, strength or thermal resistance. Examples of the crosslinking agent are sulfur, triallyl isocyanurate, triallyl cyanurate and maleic acid. Examples of the peroxide are dicumyl peroxide and benzyl peroxide. The amount of the crosslinking agent or the peroxide is usually 0.3 to 7 parts by weight, especially 1 to 4 parts by weight, per 100 parts by weight of the elastomer.

METAL-CONTAINING INORGANIC SOLID POWDER

The metal-containing inorganic solid powder to be incorporated in the chlorine-containing resin in accordance with this invention contains at least 30% by weight, preferably 50 to 90% by weight, more preferably 60 to 90% by weight, of phosphorus calculated as $P_2O_5$. Phosphorus can generally exist as a compound in the solid powder. The inorganic solid powder does not have to be in the form of a single compound and may be a mixture or solid solution of various compounds.

There is no restriction on the metal contained in the inorganic solid powder. It may be, for example, Mg, Al, P, Ca, Zn, Sc, Ga, Ge, Ti, As, V, Sr, Cd, In, Y, Sn, Zn, Sb, Nb, Ba, Hg, Tl, Pb, Bi, La, Ac, Fe, As, Sb, K, Ge, Na, Rb, Ni, Co, or Zr. The inorganic solid powder contains at least one of these metals. Usually, these metals may exist in the form of oxides.

Thus, examples of the metal-containing inorganic solid powder include phosphate glass; metal salts of phosphoric acid such as aluminum phosphate, calcium phosphate, zinc phosphate and sodium phosphate; naturally occurring ores containing phosphorus and metal; and mixtures of two or more of the foregoing materials. The phosphate glass powder and the metal phosphate powder, above all the phosphate glass powder, are preferred.

Phosphate glass is a glass (inorganic amorphous solid solution) containing phosphoric acid as one principal component, and may preferably contained CaO, $Al_2O_3$, $SiO_2$ and $Na_2SiO_3$ as other glass components either singly or in combination. Table 1 shows a typical composition (as oxides) of the phosphate glass used preferably in the present invention. It is available under the tradename UP-03PH79 from Union Co., Ltd.

TABLE 1

| Composition of phosphate glass | Manufacturer Grade | | Union Co., Ltd. UP-03PH79 |
| --- | --- | --- | --- |
| | Transition point (°C.) | | 512 |
| | Coefficient of thermal expansion × $10^{-7}$ | | 118.7 |
| 0-20 | Composition (wt. %) | $SiO_2$ | 8.6 |
| 0-20 | | $Na_2O$ | 12.0 |
| 1-99 | | CaO | 6.3 |
| 0-50 | | $K_2O$ | 7.9 |
| 1-99 | | $Al_2O_3$ | 14.6 |
| 0-10 | | $Fe_2O_3$ | 0.01 |
| 0-50 | | $B_2O_3$ | 10 |
| 1-99 | | $P_2O_5$ or $P_2O_3$ | 39.7 |
| 0-20 | | $ZnO_3$ | |

Thus, glass containing 1 to 99% by weight of calcium oxide, 1 to 99% by weight of aluminum oxide, 1 to 99% by weight of phosphorus oxide, and 0 to 99% by weight of other metal oxides in the form of oxides are preferably used. Glass containing 2 to 50% by weight of calcium oxide, 2 to 50% by weight of aluminum oxide, and 20 to 96% by weight of phosphorus oxide are more preferred. Glass containing 2 to 20% by weight of calcium oxide, 2 to 50% by weight of aluminum oxide, 30 to 70% by weight of phosphorus oxide, and 20 to 50% by weight of inorganic oxides such as silicon dioxide, boron oxide, and zirconium oxide are especially preferred.

The inorganic solid powder described above is used in the form of a fine powder having an average particle diameter of generally not more than 100 microns, preferably not more than 50 microns, more preferably 30 to 0.5 micron. As required, it may be surface-treated, for example, with silanes, and then incorporated in the chlorine-containing resin. The inorganic solid powder does not melt nor soften nor decompose at the melt-molding temperature of the chlorine-containing resin, but should desirably melt at the temperature of forced combustion, for example at the time of fire and prevent washing of the carbides. The phosphate glass powder have softening point of preferably not more than 800° C., more preferably not more than 700° C., especially preferably 400° to 600° C.

FLAME- AND FIRE-RETARDANT

The flame- and fire-retardant to be used in combination with the inorganic soli in this invention is an agent for imparting flame retardancy and fire retardancy to the composition. It is selected from the hydroxides and oxides of metals of Groups II to V of the periodic table, such as Mg, Al, P, Ca, Zn, Sc, Ga, Ge, Ti, As, V, Sn, Cd, In, Sr, Zr, Sb, Ba, Pb, Hg, and Bi.

Specific examples of such hydroxides and oxides include hydroxides such as calcium hydroxide, magnesium hydroxide, aluminum hydroxide and barium hydroxide; and oxides such as calcium oxide, aluminum oxide, magnesium oxide, lead oxide, antimony oxide, titanium oxide, zirconium oxide and zinc oxide. They may be used singly or in combination.

In the present invention, it is especially preferred to use aluminum hydroxide, magnesium hydroxide, lead oxide, aluminum oxide and antimony oxide.

The flame- and fire-retardant generally has a particle diameter of not more than 100 microns, preferably 20 to 0.5 micron, although it is not particularly critical in this invention.

OTHER ADDITIVES

As required, the resin composition of this invention may further contain additives normally employed in resin compositions of this type in addition to the two essential additive components, i.e. the metal-containing inorganic solid powder and the flame- and fire-retardance.

For example, there may be added lead-type stabilizers such as tribasic lead sulfate, dibasic sulfates and lead stearate; tin-type stabilizers such as dibutyltin maleate, dibutyltin laurate, dibutyltin mercaptide and dioctyltin mercaptide; epoxy-type stabilizers; metal soaps such as calcium stearate, barium stearate, zinc stearate and calcium stearate; lubricants such as stearic acid, low-molecular-weight polyethylene, butyl stearate, glycerin monostearate, higher alcohols, stearamide, waxes and higher fatty acid esters; processing aids such as polymethyl methacrylate; ultraviolet absorbers; and antistatic agents.

The suitable amounts of these additives are usually 0 to 15 parts by weight for the stabilizers and the metal soaps, 0 to 10 parts for the lubricants and 0 to 6 parts for the processing aids per 100 parts by weight of the chlorine-containing resin.

PREPARATION OF THE RESIN COMPOSITION

The resin composition of this invention is prepared by mixing the chlorine-containing resin with the inorganic solid powder and the flame- and fire-retardant and as required the other additives by various types of blending machines such as a supermixer, a ribbon blender, a roll blender, a mixing and grinding machine or a Banbury mixer in a customary manner, and molding the mixture by a general molding method for thermoplastic resins. The molded article can be used in the various applications described hereinafter.

The amounts of the inorganic solid powder and the flame- and fire-retardant used may be varied widely according to the types of the blending components and the use of the resin composition. Generally there may be used the following amounts per 100 parts by weight of the chlorine-containing resin.

| | Amount added (parts by weight) | | |
|---|---|---|---|
| | Generally | Preferably | Optimally |
| (a) Metal-containing inorganic solid powder | 5–200 | 5–100 | 10–60 |
| (b) flame- and fire-retardant | 5–200 | 10–100 | 20–80 |

The resin composition of this invention prepared as above may be of a rigid type or of a flexible type. In the case of the flexible type, the resin composition desirably has a hardness expressed by JIS-A hardness of not more than 99, preferably 25 to 95, more preferably 30 to 90, especially preferably 40 to 90. It is preferred therefore to prepare the composition so as to have a JIS-A hardness of 50 to 70 for use as a gasket, and to have a JIS-A hardness of 70 to 90 for use as a wire sheath.

The flexible resin composition of this invention usually is flexible and has excellent rubbery elasticity and yet when exposed to fire for a long period of time, exhibits excellent fire retardancy and low smoke-generating property, and even when burnt forcibly, has resistance to deformation or burning off and forms a firm sintered residue, and shuts off fire. In the case of a rigid formulation, the composition has the same fire retardancy, low smoke-generating property and sintering property.

The JIS-A hardness of the composition of this invention, as used in this specification, is measured by the following method.

A spring-type hardness tester, type A, stipulated in JIS K-6301, 5, was used, and five test specimens, about 25 × 70 mm (thickness 3 mm), were horizontally laid. The hardness tester was maintained horizontal and pressurizing surfaces were contacted lightly so that the pressing needle became perpendicular to the measuring surface of the test specimens. Within one second after the contact, the scale was read and the hardness was determined.

The resin composition of this invention has excellent flame retardancy, fire retardancy, sintering and solidifying property, low smoke-generating property, antimelt sagging property, rubbery elasticity and weatherability and may be used in many applications. For example, with flexible formulations, it can be used as wire coverings, power cable sheaths, gaskets for vehicles, gaskets for glass fire doors, various packings, joint materials, fire-resistant hoses and tubes, cushioning materials, containers, films, leathers, foamed leathers, laminated sheets, wall materials, ceiling materials, and floor materials. With rigid formulations, it may be used in household electrical appliance parts, plastic sashes, pipings for sprinklers, and wire protecting tubes.

The resin composition of this invention may cover part or the whole of fibers or a fibrous product such as a fibrous cloth. They may, for example, be natural fibers, semi-synthetic fibers, synthetic fibers or inorganic fibers or fibrous cloth composed of such fibers. Preferably, vegetable fibers, animal fibers, and mineral fibers are used as the natural fibers; metallic fibers, glass fibers, rock wool, slag wool and carbon fibers, as the inorganic fibers; viscose rayon, nitrocellulose fibers, and cellulose acetate fibers, as the semi-synthetic fibers; and polyamide fibers, polyester fibers, polyurethane fibers, polyethylene fibers, polypropylene fibers, polystyrene fibers, polyvinyl chloride fibers, polyfluoroethylene fibers, polyacrylic fibers, and polyvinyl alcohol fibers, as the synthetic fibers.

The size of the fibers used in the fibrous products is generally 10 to 1000 denier, preferably 100 to 500 denier. The preferred density of the fibrous substrate is 110×10 (inch) to 100×100 (inch).

In particular, carbon fibers, glass fibers, mica fibers, asbestos fiber, and rock wool as the inorganic fibers and Teflon fibers as the synthetic fibers have excellent fire retardancy and can be used favorably.

The fire retardant fibrous cloth coated with the resin composition of this invention is fire-resistant and even when forcibly burnt, generates little smoke and has excellent anti-melt sagging property and resistance to burning off. It can be used advantageously, for example, in leathers in vehicles, canvases for ships and boats, fire-preventive curtains for a construction site, foamed leathers, wall materials, ceiling materials and floor materials.

The following examples illustrate the present invention more specifically. All parts and percentages in these examples are by weight.

EXAMPLE 1

Twenty parts of (B) a phosphate glass powder having an average particle diameter of 30 microns and a $P_2O_5$ content of 58.8% as the phosphorus- and metal-containing inorganic solid powder, and 20 parts of (C) aluminum hydroxide powder and 20 parts of antimony trioxide as the flame- and fire-retardant were added to (A) a thermoplastic resin composition composed of 100 parts of chlorinated vinyl chloride resin having a chlorine content of 68% and a specific viscosity of 0.57, 4 parts of tribasic lead sulfate as a stabilizer, 1.5 parts of dibasic lead stearate, and 1 part of lead stearate. They were mixed for 20 minutes at 110° C. by an Ishikawa-type mixing and grinding machine. The mixture was then kneaded for 10 minutes on a mixing roll having a diameter of 8 inches and kept at 150° to 190° C. to prepare roll sheets having a thickness of 0.55 mm. A required number of the roll sheets were laminated and pressed by a press kept at 170° to 200° C. to form a press sheet of a required thickness (sample).

The various properties of the press sheet were evaluated by the methods shown in the test examples given hereinbelow.

EXAMPLES 2-10

Example 1 was repeated except that (A) the chlorine-containing resin and the softening agent, (B) the phosphorus- and metal-containing inorganic solid powder and (C) the flame- and fire-retardant agent were used in the amounts shown in Table 2.

COMPARATIVE EXAMPLES 1-5 AND 7

Example 1 was repeated except that (A) the chlorine-containing resin and the softening agent, (B) the phosphorus- and metal-containing inorganic solid powder and (C) the flame- and fire-retardant agent were used in the amounts shown in Table 3.

COMPARATIVE EXAMPLE 6

Example 1 was repeated except that 100 parts of a urethane resin was used instead of the chlorine-containing resin, the softening agent and the stabilizer as shown in Table 3.

In Table 3, the symbol "-" indicates that the indicated component was not added.

The results of evaluation of the samples molded in Examples 1 to 10 and Comparative Examples 1 to 7 are summarized in Tables 4 and 5.

The details of the compositions used in these Examples and Comparative Examples are shown in Table 6.

Testing Methods

The press plates obtained in Examples 1 to 10 and Comparative Examples 1 to 7 were tested by the following testing methods.

(1) Hardness

A spring-type hardness tester, type A, stipulated in JIS K-6301, 5, was used, and five test specimens, about 25×70 mm (thickness 3 mm), were horizontally laid. The hardness tester was maintained horizontal and pressurizing surfaces were contacted lightly so that the pressing needle became perpendicular to the measuring surface of the test specimen Within one second after the contact, the scale was read and the hardness was determined.

(2) Combustibility

A test specimen, 3 mm in thickness, 30 mm in width and 100 mm in length, was supported at a position 150 mm from the nozzle of a propane gas burner so that the flame of the laterally set burner would be applied perpendicularly to the test specimen. The flame (diameter 40 mm and length 200 mm) of the propane gas burner was directly applied to the central part of the specimen, and the distance between the flame and the test specimen was adjusted so that the surface temperature of the central part of the specimen became about 800±10° C. The amount of smoke generated from the test specimen when it began to be exposed to the flame of the burner was observed visually, and rated in 5 ranks, i.e. very small, small, slightly large, large and very large. The test specimen was continued to be exposed to the flame of the burner for 10 minutes. When more than half of the test specimen dropped off as a result of burning off or melt-sagging, the time which elapsed until the dropping and the state of the test specimen were recorded. When more than half of the test specimen remained as a solid residue, the sintered hardness of the residue was measured, and the change in the state of the specimen was observed, by the following procedures.

Sintered hardness

A residue sample, square with one side measuring about 10 mm, was placed on a stainless steel plate, and pushed by a push meter (made by Aiko Engineering Co., Ltd.) fitted with a flat plate adaptor having a diameter of 15 mm, and the lowest load which caused destruction of the sample was measured. The measurement was made on five samples, and the average value was determined. The symbol "-" shows that the sample could not retain its shape and the sintered hardness could not be measured.

Change in state

The residue sample was observed for the state of foaming, and the degrees of peeling, expansion and cracking. The symbol "-" shows that the sample could not retain its shape when it was touched upon by hand.

(3) Oxygen index

The oxygen index was measured in a test sample having a thickness of 2 mm, a width of 60 mm, a length of 150 mm by the testing method stipulated in JIS K-7201.

(4) Weatherability test

A test specimen, 2 mm thick, 60 mm wide and 100 mm long, was attached to an aluminum plate, and exposed outdoors :or one year while it was maintained sourtherly at an inclination angle of 45°. The ratio of the residue of elongation was determined.

(5) Rubbery elasticity

Compression test: A test sample a having a thickness of 3 mm, a width of 3.5 cm and a length of 8 cm shown in FIG. 1 [FIG. 1, (1)] was bent centrally at an angle of about 180° in the longitudinal direction and fixed [FIG. 1, (2)]. Twenty minutes later, the fixing was released. Further, 2 minutes later, the recovery residual angle α [FIG. 1, (3)] at the time of releasing the fixation to the angle before testing was measured, and made a measure of rubbery elasticity.

(6) Heat aging test

A test sample, 3 mm thick, 30 mm wide, and 50 mm long, was heated for 60 minutes in a Geer's oven kept at 200° C., and the change of coloration and the foaming on the surface were observed.

(7) Fire resistance

A test sample (a laminated sheet having a size of 300×300 mm) was supported at a position 150 mm from the nozzle opening of the burner so that the flame of a propane gas burner set laterally would be directly perpendicularly to the test sample. The flame of the propane gas burner (the flame had a length of 200 mm) was directly applied to the central part of the test sample, and the state of smoke generation, time required for the flame to penetrate the sheet, and the degree of deformation of the sheet were evaluated.

(8) Resistance to molten iron

The tip of an iron bar having a diameter of about 3 mm was melted by an oxygen-acetylene gas burner, and five drops of molten iron balls having a diameter of about 5 mm were allowed to drop onto a laminate sheet (300 mm×300 mm×thickness 1 mm) so that they existed sparsely near the center of the sheet. The amount of smoke (the degree of smoke generation), the burning time (the average time which elapsed from the contacting of the molten iron balls with the laminate sheet to cause fire until the fire extinguished), and the dropped area (the average area of parts which dropped as a result of melting and burning by the dropping of molten iron balls after spontaneous cooling).

(9) Appearance and feel

The surface of the laminate sheet was observed for smoothness and bleeding of the plasticizer, etc., and the feel of the surface such as stickiness and tactile hand. The results were evaluated by "poor" where the sample had problems or "good" where the sample had no problem.

TABLE 2

| Example | (A) Chlorine-containing resin and softening agent | | | | (B) Phosphorus-metal-containing inorganic solid | | | (C) Fire- and flame-retardant | |
|---|---|---|---|---|---|---|---|---|---|
| | Name | Parts by weight | Name | parts by weight | Name | $P_2O_5$ content (%) | Parts by weight | Name | Parts by weight |
| 1 | chlorinated vinyl chloride resin (1) | 100 | trioctyl phosphate | 50 | phosphate glass powder (1) | 39.7 | 20 | aluminum hydroxide antimony trioxide | 20 20 |
| 2 | chlorinated vinyl chloride resin (2) | 100 | trioctyl phosphate chlorinated polyethylene (1) | 90 50 | phosphate glass powder (2) | 58.8 | 80 | aluminum hydroxide antimony trioxide | 80 30 |
| 3 | chlorinated vinyl chloride resin (2) | 100 | tricresyl phosphate chlorinated polyethylene (1) | 90 50 | boron phosphate sodium hexametaphosphate | 65.0 68.6 | 40 40 | aluminum hydroxide zinc oxide | 30 80 |
| 4 | chlorinated vinyl chloride resin (2) | 100 | ethylene/vinyl acetate copolymer chlorinated polyethylene (1) | 50 90 | phosphate glass powder (2) | 58.8 | 80 | aluminum hydroxide antimony trioxide | 80 30 |
| 5 | chlorinated vinyl chloride resin (3) | 100 | ethylene/vinyl acetate copolymer MBS | 10 10 | tetiary calcium phosphate | 45.8 | 30 | lead oxide | 30 |
| 6 | vinyl chloride resin | 100 | trioctyl phosphate chlorinated polyethylene (1) | 90 50 | phosphate glass powder (2) | 53.8 | 80 | aluminum hydroxide antimony trioxide | 80 30 |
| 7 | chlorinated vinyl chloride resin (1) | 100 | dioctyl phthalate urethane resin | 90 50 | phosphate glass powder (1) | 39.7 | 80 | aluminum hydroxide aluminum trioxide | 80 30 |
| 8 | chlorinated vinyl chloride resin (1) | 100 | trioctyl phosphate chlorinated polyethylene (1) | 90 50 | trialuminum phosphate | 53.5 | 80 | aluminum hydroxide antimony trioxide | 80 30 |
| 9 | chlorinated vinyl chloride resin (2) | 100 | trioctyl phosphate chlorinated | 30 120 | phosphate glass powder (1) | 58.8 | 80 | aluminum hydroxide antimony | 80 30 |

TABLE 2-continued

| | (A) Chlorine-containing resin and softening agent | | | (B) Phosphorus-metal-containing inorganic solid | | | (C) Fire- and flame-retardant | |
|---|---|---|---|---|---|---|---|---|
| Example | Name | Parts by weight | Name | parts by weight | Name | P₂O₅ content (%) | Parts by weight | Name | Parts by weight |
| 10 | chloroprene | 100 | polyethylene (1) — | | trialuminum phosphate | 53.5 | 50 | antimony trioxide | 50 |

TABLE 3

| Comparative Example | (A) Chlorine-containing resin and softening agent | | | | (B) Phosphorus-metal-containing inorganic solid | | | (C) Fire- and flame-retardant | |
|---|---|---|---|---|---|---|---|---|---|
| | Name | Parts by weight | Name | parts by weight | Name | P₂O₅ content (%) | Parts by weight | Name | Parts by weight |
| 1 | chlorinated vinyl chloride resin (2) | 100 | trioctyl phosphate | 90 | — | | | — | |
| | | | chlorinated polyethylene | 50 | | | | | |
| 2 | Vinyl chloride resin | 100 | trioctyl phosphate | 90 | — | | | aluminum hydroxide | 80 |
| | | | chlorinated polyethylene (1) | 50 | | | | antimony trioxide | 30 |
| 3 | chlorinated vinyl chloride resin (2) | 100 | trioctyl phosphate | 90 | — | — | — | aluminum hydroxide | 80 |
| | | | chlorinated polyethylene (1) | 50 | | | | antimony trioxide | 30 |
| 4 | chlorinated vinyl chloride resin (2) | 100 | trioctyl phosphate | 90 | phosphate glass powder (2) | 58.8 | 80 | — | — |
| | | | chlorinated polyethylene (1) | 50 | | | | | |
| 5 | chlorinated vinyl chloride resin (2) | 100 | trioctyl phosphate | 90 | Soda ash glass powder (1) | — | 80 | aluminum hydroxide | 80 |
| | | | chlorinated polyethylene (1) | 50 | | | | antimony trioxide | 30 |
| 6 | urethane resin (1) | 100 | — | — | trialuminum phosphate | 53.5 | 50 | antimony trioxide | 50 |
| 7 | chlorinated vinyl chloride resin (3) | 100 | ethylene/vinyl acetate copolymer | 10 | tertiary calcium phosphate | 45.8 | 30 | ferric oxide | 30 |
| | | | MBS | 10 | | | | | |

TABLE 4

(Results of Examples 1-10)

| | | Combustion properties | | | | | | Weatherability test, residual elongation ratio | Rubbery elasticity | Heat-aging property |
|---|---|---|---|---|---|---|---|---|---|---|
| Example | Hardness | Amount of smoke generated | Dropping time (sec.) | State of the dropped material | Sintered hardness (g) | State of the sintered material | Oxygen index | | | |
| 1 | 73 | small | >600 | no dropping | 350 | expanded, cracked | 35.0 | 91 | 88 | good |
| 2 | 70 | very small | >600 | no dropping | 2630 | little deformation, nearly smooth | 39.0 | 93 | 55 | very good |
| 3 | 69 | very small | >600 | no dropping | 1220 | medium deformation, slightly uneven | 35.5 | 90 | 60 | very good |
| 4 | 78 | very small | >600 | no dropping | 450 | much foaming, cracked | 34.0 | 91 | 75 | good |
| 5 | 98 | very small | 560 | hard and porous | 160 | much deformation, uneven | 34.5 | 90.5 | 160 | good |
| 6 | 77 | slightly large | 510 | disintegrable by finger touch | 100 | much deformation, uneven | 29.0 | 91.0 | 92 | fair |
| 7 | 68 | small | 490 | disintegrable by finger touch | 90 | much deformation, uneven | 32.5 | 90.5 | 90 | slightly good |
| 8 | 72 | very small | >600 | no dropping | 200 | expanded, foamed and cracked | 36.5 | 91 | 86 | good |
| 9 | 82 | very small | >600 | no dropping | 1300 | medium deformation, | 35.0 | 92 | 56 | good |

TABLE 4-continued (Results of Examples 1-10)

| Example | Hardness | Combustion properties | | | | | Oxygen index | Weatherability test, residual elongation ratio | Rubbery elasticity | Heat-aging property |
|---|---|---|---|---|---|---|---|---|---|---|
| | | Amount of smoke generated | Dropping time (sec.) | State of the dropped material | Sintered hardness (g) | State of the sintered material | | | | |
| 10 | 77 | slightly large | >600 | no dropping | 1120 | slightly uneven medium deformation, slightly uneven | 32.0 | 90 | 50 | good |

TABLE 5

(Results of Comparative Examples 1-7)

| Comparative Example | Hardness | Combustion properties | | | | | Oxygen index | Weatherability test, residual elongation ratio | Rubbery elasticity | Heat-aging property |
|---|---|---|---|---|---|---|---|---|---|---|
| | | Amount of smoke generated | Dropping time (sec.) | State of the dropped material | Sintered hardness (g) | State of the sintered material | | | | |
| 1 | 67 | small | 98 | little sagging, reduced to ash and disappeared | — | — | 31.5 | 85 | 120 | foamed and carbonized |
| 2 | 74 | very large | 40 | sagging great, reduced to cotton-like ash | — | — | 25.5 | 87 | 90 | good |
| 3 | 69 | small | 130 | disintegrable by finger touch | — | — | 32.5 | 88 | 76 | good |
| 4 | 70 | small | 325 | disintegrable by finger touch | — | — | 26.0 | 89 | 77 | discolored to brown |
| 5 | 70 | small | 450 | disintegrable by finger touch | — | — | 32.0 | 82 | 54 | good |
| 6 | 68 | large | 25 | completely disappeared | — | — | 20.0 | 73 | 48 | good |
| 7 | 98 | small | 280 | reduced to ash | — | — | 30.5 | 65 | 77 | decomposed and foamed |

TABLE 6

| Resins | |
|---|---|
| Vinyl chloride resin | straight PVC, specific viscosity = 0.24 |
| Chlorinated vinyl chloride resin | (1) Cl content = 68%, specific viscosity = 0.23 |
| Chlorinated vinyl chloride resin | (2) Cl content = 68%, specific viscosity = 0.57 |
| Chlorinated vinyl chloride resin | (3) Cl content = 65%, specific viscosity = 0.23 |
| Chloroprene resin | Denka Chloroprene M100 made by Denki Kagaku |
| Urethane resin | PANDEX T-5265M made by Dainippon Ink and Chemicals, Inc. |
| Softening agent | |
| Trioctyl phosphate | DISFRAMOL TOF made by Bayer Japan Co., Ltd. |
| Dioctyl phthalate | DOP made by Daihachi Chemical Co., Ltd. |
| Chlorinated polyethylene | (1) Cl content = 35%, molecular weight = about 250,000 |
| Chlorinated polyethylene | (2) Cl content = 30%, molecular weight = about 350,000 |
| Ethylene/vinyl acetate copolymer | vinyl acetate = 45% |
| MBS | methyl methacrylate/butadiene/styrene terpolymer |
| Phosphorus-containing inorganic solid powder | |
| Phosphate glass powder | (1) $P_2O_5$—$Na_2O$—$CaO$—$Al_2O_3$-type glass powder, average particle diameter 30μ, $P_2O_5$ = 58.8% by weight |
| Phosphate glass powder | (2) $P_2O_5$—$Na_2O$—$CaO$—$K_2O$-type glass powder, average particle diameter 60μ, $P_2O_5$ = 39.7% by weight |
| Boron phosphate | $P_2O_5$ content = 68.9%, $(NaPO_3)_n$ |
| Sodium hexametaphosphate | |
| Potassium polyphosphate | $P_2O_5$ content = 46-52%, $K_6P_4O_{13}$ |
| Aluminum phosphate | $P_2O_5$ content = 53.0%, $AlPO_4$ |
| Fire- and flame-retardant | |
| Aluminum hydroxide | average particle diameter 1.0μ |
| Magnesium hydroxide | average particle diameter 1.0μ |
| Antimony trioxide | average particle diameter 1.0μ |

TABLE 6-continued

| | |
|---|---|
| Lead oxide | average particle diameter 0.5μ |
| Zinc oxide | average particle diameter 0.8μ |
| Ferric oxide | average particle diameter 0.8μ |

The above results show that the resin composition and molded articles in accordance with this invention were very flame-retardant and generated only small amounts of smokes, and even when exposed to fire for a long period of time, the cinders remain solid without being disintegrated. In other words, they have excellent sintering and solidifying property, do not easily separate from articles which they cover, and as a result of forming solid cinders, they produce an excellent effect of continuing to be a fire preventing material and a flame preventing material by heat insulation, covering and protection.

EXAMPLE A AND COMPARATIVE EXAMPLE A

A vinyl chloride resin having a high degree of polymerization was post-chlorinated to give a chlorinated vinyl chloride resin having a chlorine content of 68% and a specific viscosity of 0.57. One hundred parts of the chlorinated vinyl chloride resin, 70 parts of trioctyl phosphate (plasticizer) as a softening agent, 50 parts of chlorinated polyethylene (elastomer) having a chlorine content of 35%, 5.0 parts of tribasic lead sulfate, 2.0 parts of dibasic lead stearate, 2.0 parts of stearic acid, 2.0 parts of wax-type lubricant and 2.0 parts of a pigment were mixed by a Henschel mixer to give a thermoplastic flexible resin compound (A). One hundred parts of (B) phosphate glass powder $P_2O_5=58\%$) and 100 parts of aluminum oxide and 20 parts of antimony trioxide as flame-retardant strengthening agents (C) were added to the compound (A), and they were mixed by a Henshel mixer. A gasket was molded from the resulting mixture by using a twin-screw extruder having a screw diameter of 65 mm. The properties of the gasket obtained, and the properties of aluminum sash glass door are shown in Table 7.

The productivity of gasket production and the appearance of the gasket were good. The gasket could be mounted on the aluminum sash with good operability.

The aluminum sash glass door equipped with the gasket was subjected to a forced burning test by using a large-sized burner. As compared with a commercial vinyl chloride-type aluminum sash glass door, the aluminum sash glass door having the above gasket was fire retardant, and did not easily melt and drip or sag. The sintered product of the gasket formed, and prevented the glass from separating from the aluminum sash.

TABLE 7

| | | Example A Gasket | Comparative Example A Commercial gasket of vinyl chloride resin |
|---|---|---|---|
| Amount discharged from two-screw (65 mm0) extruder | | 125 kg/hr | — |
| Appearance of the gasket | | good | good |
| Hardness of the gasket (JIS-A) | | 67 | 65 |
| Rubbery elasticity | | ◎ | ◎ |
| Aluminum sash glass door burning test (*) | Smoke generation initiation time | 5'00 | 2'30 |
| | Degree of smoke generation | small | large |
| | Heated side | 7'00 | 4'00 |

TABLE 7-continued

| | Example A Gasket | Comparative Example A Commercial gasket of vinyl chloride resin |
|---|---|---|
| burning initiation time | | |
| Non-heated side burning initiation time | (not burnt) (>30'00) | 10'30 |
| Burnability of the gasket | very hard to burn | very easy to burn |
| Dimensional change of the gasket | changed little with respect to the original shape | melted and dripped; changed greatly |
| Burning residue | remaining as a solid | reduced to ash and burnt down nearly completely |
| Glass holding property | very strong | none |

(*) JIS A1311: Fire prevention test by second class heating curve

EXAMPLE B

One hundred parts of chlorinated vinyl chloride resin (specific viscosity 0.3, chlorine content 68%), 90 parts of trioctyl phosphate, 60 parts of chlorinated polyethylene (chlorine content 35%), 100 parts of phosphate glass powder (average particle diameter 30 microns, $P_2O_5$ content 58.8%), 50 parts of antimony trioxide, and 100 parts of aluminum hydroxide were mixed by an Ishikawa-type mixing and grinding machine and then kneaded on an 8-inch mixing roll. The mixture was processed on four 8-inch inverse L-shaped calendar rolls to form a film having a thickness of 200 microns. A polyester fibrous cloth composed of 31×30 250-denier polyester fibers/inch was prepared, and the above film was superimposed on each side of the base cloth, and the assembly was press-formed by a press kept at 150° to 180° C. to form a laminate sheet having a thickness of about 400 microns.

The resulting sheet was subjected to a flame retardancy test. It showed an oxygen index (JIS K7201) of 41, flame-resistance penetration time of 32 seconds, and excellent molten iron resistance, appearance, tactile hand and hardness.

We claim:

1. A chlorine-containing resin composition comprising a chlorine-containing resin selected from the group consisting of a vinyl chloride polymer, a chlorinated vinyl chloride polymer, a chlorinated polyolefin and a chlorinated rubber and (a) 5 to 200 parts by weight, per 100 parts by weight of the chlorine-containing resin, of a phosphate glass containing at least 30% by weight of phosphorus as $P_2O_5$ and (b) 5 to 200 parts by weight, per 100 parts by weight of the chlorine-containing resin, of at least one flame- and fire-retardant agent selected from hydroxides and oxides of metals belonging to Groups II to V of the periodic table.

2. The resin composition of claim 1 in which the chlorine-containing resin is at least one resin selected from the group consisting of vinyl chloride resins, chlorinated polyethylene and chloroprene.

3. The resin composition of claim 1 in which the chlorine-containing resin is a chlorinated vinyl chloride resin having a chlorine content of about 60 to about 72% by weight, and a specific viscosity of at least about 0.20.

4. The resin composition of claim 1 in which the chlorine-containing resin is a chlorinated vinyl chloride resin having a chlorine content of 64 to 70% by weight and a specific viscosity of at least 0.4 obtained by post-chlorinating a vinyl chloride resin having an average degree of polymerization of at least 1,300.

5. The resin composition of claim 1 in which the chlorine-containing resin is a chlorinated vinyl chloride resin having a chlorine content of 64 to 70% by weight and a specific viscosity of at least 0.4 obtained by post-chlorinating a vinyl chloride resin having an average degree of polymerization of 2,500 to 10,000.

6. The resin composition of claim 1 in which the chlorine-containing resin is a chlorinated vinyl chloride resin, a vinyl chloride resin or a mixture of both and contains a softening agent.

7. The resin composition of claim 6 in which the softening agent is a plasticizer, an elastomer or a mixture of both.

8. The resin composition of claim 7 in which the elastomer is chlorinated polyethylene, an ethylene/vinyl acetate copolymer or nitrile rubber.

9. The resin composition of claim 7 in which the proportion of the plasticizer is 50 to 150 parts by weight per 100 parts by weight of the chlorine-containing resin.

10. The resin composition of claim 7 in which the proportion of the elastomer is 50 to 150 parts by weight per 100 parts by weight of the chlorine-containing resin.

11. The resin composition of claim 1 in which the phosphate glass contains 50 to 90% by weight of phosphorus calculated as $P_2O_5$.

12. The resin composition of claim 11 in which the phosphate glass contains 66 to 90% by weight of phosphorus calculated as $P_2O_5$.

13. The resin composition of claim 1 in which the phosphate glass comprises 1 to 99% by weight of calcium oxide, 1 to 99% by weight of aluminum oxide, 30 to 99% by weight of phosphorus oxide and 0 to 99% by weight of other metal oxides, in the form of an oxide.

14. The resin composition of claim 13 in which the phosphate glass comprises 2 to 50% by weight of calcium oxide, 2 to 50% by weight of aluminum oxide and 30 to 96% of phosphorus oxide, in the form of an oxide.

15. The resin composition of claim 1 in which the phosphate glass has an average particle diameter of not more than 50 microns.

16. The resin composition of claim 1 in which the phosphate glass powder has a softening point of not more than 700° C.

17. The resin composition of claim 1 in which the fire- and flame-retardant is selected from the group consisting of calcium hydroxide, magnesium hydroxide, aluminum hydroxide, barium hydroxide, calcium oxide, aluminum oxide, magnesium oxide, lead oxide, antimony trioxide, titanium oxide, zirconium oxide and zinc oxide.

18. The resin composition of claim 17 in which the fire- and flame-retardant is selected from the group consisting of aluminum hydroxide, magnesium hydroxide, aluminum hydroxide, barium hydroxide, calcium oxide, aluminum oxide, magnesium oxide, lead oxide, antimony trioxide, titanium oxide, zirconium oxide and zinc oxide.

19. The resin composition of claim 1 in which the fire- and flame-retardant has an average particle diameter of not more than 100 microns.

20. The resin composition of claim 1 in which 5 to 100 parts by weight of the phosphate glass (a) and 10 to 100 parts of the fire- and flame-retardant (b) are used per 100 parts by weight of the chlorine-containing resin.

21. The composition of claim 1 which is a flexible resin composition having a hardness, in terms of a JIS-A hardness, of not more than 99.

22. An electric wire or cable covered with the composition of claim 1.

23. A plastic sash, a fire-resisting hose, tube or protective tube formed of the composition of claim 1.

24. A gasket, joint or packing formed of the composition of claim 1.

25. The resin composition of claim 1 in which the phosphate glass comprises 2 to 20% by weight of calcium oxide, 2 to 50% by weight of aluminum oxide, 30 to 70% by weight of phosphorus oxide and 20 to 50% by weight of at least one other inorganic oxide, in the form of an oxide.

26. The resin composition of claim 1 in which the phosphate glass has an average particle diameter of 30 to 0.5 micron.

27. The resin composition of claim 1 in which the phosphate glass powder has a softening point of 400° to 600° C.

28. The resin composition of claim 1 in which the fire- and flame-retardant has an average particle diameter of 20 to 0.5 micron.

29. The composition of claim 1 which is a flexible resin composition having a hardness, in terms of a JIS-A hardness, of 25 to 95.

* * * * *